US008881452B2

(12) United States Patent
Pacholyk et al.

(10) Patent No.: US 8,881,452 B2
(45) Date of Patent: Nov. 11, 2014

(54) TOMATO TOWER WITH ADJUSTABLE SUPPORT TRAYS

(71) Applicants: Thomas W. Pacholyk, Weedsport, NY (US); Jill M. Pacholyk, Weedsport, NY (US)

(72) Inventors: Thomas W. Pacholyk, Weedsport, NY (US); Jill M. Pacholyk, Weedsport, NY (US)

( * ) Notice: Subject to any disclaimer, the term of this patent is extended or adjusted under 35 U.S.C. 154(b) by 126 days.

(21) Appl. No.: 13/847,346

(22) Filed: Mar. 19, 2013

(65) Prior Publication Data

US 2014/0283444 A1    Sep. 25, 2014

(51) Int. Cl.
*A01G 17/06* (2006.01)
*A01G 9/12* (2006.01)
*A01G 17/04* (2006.01)

(52) U.S. Cl.
CPC .................................. *A01G 17/04* (2013.01)
USPC ............................... 47/45; 211/190; 211/187

(58) Field of Classification Search
USPC .......... 47/45, 44; 211/88.03, 85.23, 192, 191, 211/190, 187, 207, 189; 248/558, 27.8, 248/121, 124.1, 125.3; 108/106–108, 137, 108/144.11, 147.11, 152
See application file for complete search history.

(56) References Cited

U.S. PATENT DOCUMENTS

| | | | | |
|---|---|---|---|---|
| 3,113,400 | A | * | 12/1963 | Emond .............................. 47/45 |
| 4,026,068 | A | | 5/1977 | Tepper |
| 4,677,788 | A | | 7/1987 | Mastandrea |
| 5,067,274 | A | | 11/1991 | Lewis |
| 5,215,199 | A | * | 6/1993 | Bejarano .......................... 211/74 |
| D362,356 | S | | 9/1995 | Nicholas |
| 5,640,802 | A | | 6/1997 | Elliott |
| 5,799,788 | A | * | 9/1998 | Webb ............................. 206/366 |
| 6,385,901 | B1 | | 5/2002 | Wahlberg |
| 6,729,484 | B2 | * | 5/2004 | Sparkowski .................. 211/187 |
| 7,003,913 | B1 | | 2/2006 | Smith |
| D542,611 | S | | 5/2007 | Wilson |
| D615,831 | S | | 5/2010 | Whitney et al. |
| 7,918,051 | B2 | | 4/2011 | Early |
| 2012/0090230 | A1 | * | 4/2012 | Frost et al. ......................... 47/45 |
| 2012/0159844 | A1 | * | 6/2012 | Davis ................................. 47/45 |
| 2014/0109474 | A1 | * | 4/2014 | Reed, Jr. ............................ 47/45 |

* cited by examiner

*Primary Examiner* — Shadi Baniani
*Assistant Examiner* — Magdalena Topolski
(74) *Attorney, Agent, or Firm* — Richard L. Miller (57) ABSTRACT

A device for a tomato plant having tomatoes and a vine and replaceably supporting from four orthogonal directions and from varying heights relocation of the tomatoes of the tomato plant from lower elevations to higher elevations as the tomato plant grows. The device includes uprights, cross members, and supports. The uprights are held together by the cross members. The supports are operatively and replaceably connected to the uprights, and replaceably support from the four orthogonal directions and from the varying heights the relocation of the tomatoes of the tomato plant from the lower elevations to the higher elevations as the tomato plant grows.

41 Claims, 4 Drawing Sheets

TOMATO TOWER WITH ADJUSTABLE SUPPORT TRAYS

1. BACKGROUND OF THE INVENTION

A. Field of the Invention

The embodiments of the present invention relate to a support for a tomato plant, and more particularly, the embodiments of the present invention relate to a device for a tomato plant having tomatoes and a vine and for replaceably supporting from four orthogonal directions and from varying heights relocation of the tomatoes of the tomato plant from lower elevations to higher elevations as the tomato plant grows.

B. Description of the Prior Art

Numerous innovations for supports for tomato plants and the like have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a device for a tomato plant having tomatoes and a vine and for replaceably supporting from four orthogonal directions and from varying heights relocation of the tomatoes of the tomato plant from lower elevations to higher elevations as the tomato plant grows.

(1) U.S. Pat. No. 4,026,068 to Tepper

U.S. Pat. No. 4,026,068—issued to Tepper on May 31, 1977 in U.S. class 47 and subclass 45—teaches a tomato plant support that uses plural stakes or uprights in surrounding relation about the plant and lateral members extending from these stakes to support the tomato-laden vines of the plant. The lateral members are intentionally not continuous. Specifically, the discontinuity, or openings, in the vine support structure facilitate the relocation of each vine from a lower to a higher elevation support in response to the growth of the plant.

(2) U.S. Pat. No. 4,677,788 to Mastandrea

U.S. Pat. No. 4,677,788—issued to Mastandrea on Jul. 7, 1987 in U.S. class 47 and subclass 47—teaches a support for tomato plants and the like to reinforce them while growing. It is, preferably, of plastic material having a bottle shape with an elongated neck. The neck is progressively increased in diameter from the top to the base portion. At the points of increasing diameter, there is a shoulder serving as a stop for a slip-fitted neck portion. On the shoulder is supported a wheel-like ring onto which the plants may be tied. Several of these rings of increasing diameter of sleeve are provided. The neck instead may be progressively tapered downwardly and outwardly with the wheel-like rings held in place by the taper. Holes are provided at a distance above the bottom of the base portion to provide a reservoir of water for stabilizing the tube in the soil

(3) U.S. Pat. No. 5,067,274 to Lewis

U.S. Pat. No. 5,067,274—issued to Lewis on Nov. 26, 1991 in U.S. class 47 and subclass 47—teaches a tomato pole having a plurality of spaced and V-shaped slanted slots entrant from one side thereof. The pole is hollow and can be driven into the ground, with one or more of the slots, preferably, being subterranean in use so that irrigation water can be poured into the top of the pole and will irrigate through the lower notches. The spaced notches enable the user to use anything available for transverse tomato plant support sticks.

(4) U.S. Pat. No. Des. 362,356 to Nicholas

U.S. Pat. No. Des. 362,356—issued to Nicholas on Sep. 19, 1995 in U.S. class D6 and subclass 417—teaches the ornamental design for a tomato plant support.

(5) U.S. Pat. No. 5,640,802 to Elliott

U.S. Pat. No. 5,640,802—issued to Elliott on Jun. 24, 1997 U.S. class 47 and subclass 45—teaches a support assembly for growing tomato plants, which allows ready access to the plant during the various stages of growth by utilizing interchangeable parts including post sections having a tapered member on a bottom end and a tapered socket on the other end for joining the sections to form continuous posts having vertically spaced seating locations, and horizontal supports having sockets that fit securely onto post sections and spaced vertically to form modules that may be stacked in vertical relation and thereby add progressively to meet the needs engendered by growth of the plant and to permit ready access to the plant.

(6) U.S. Pat. No. 6,385,901 to Wahlberg

U.S. Pat. No. 6,385,901—issued to Wahlberg on May 14, 2002 in U.S. class 47 subclass 45—teaches a plant support cage apparatus. Two or more panels of rectangular shape are joined on the vertical edges by a series of coil cavity and corresponding rod connections alternated by hook restraints. Unit thus formed when the plurality of the panels is fully joined together is a cylindrical cage. All connections made at the vertical edges of the panels are formed from and are part of the panel lattice. The unit is rigid as a separate unit and stable when pressed in the ground by the stakes that are extensions also part of the vertical members of the lattice. The cage can be enlarged or contracted by the addition of panel units. It is assembled and dissembled without special tools and stacked by nesting of the sections.

(7) U.S. Pat. No. 7,003,913 to Smith

U.S. Pat. No. 7,003,913—issued to Smith on Feb. 28, 2006 in U.S. class 47 and subclass 44—teaches a vegetable cradle with a rigid support platform that is radially curved when looking at an end view and straight and parallel to the ground when looking at a side view. A plurality of legs are attached to the underside of the platform to keep the lowest portion of the platform approximately one inch off the ground. The platform has a plurality of ventilation slots and/or apertures thereby allowing a fruit or vegetable to be ventilated. The platform is constructed of transparent material, such as clear acrylic plastic. In a preferred embodiment, the legs include a broad foot to help prevent the legs from sinking into the ground.

(8) U.S. Pat. No. Des. 542,611 to Wilson

U.S. Pat. No. Des. 542,611—issued to Wilson on May 15, 2007 in U.S. class D8 and subclass 1—teaches the ornamental design for a tomato cage panel.

(9) U.S. Pat. No. Des. 615,831 to Whitney et al

U.S. Pat. No. Des. 615,831—issued to Whitney et al. on May 18, 2010 in U.S. class D8 and subclass 1—teaches the ornamental design for a support cage for tomato plants and other live plants.

(10) U.S. Pat. No. 7,918,051 to Early

U.S. Pat. No. 7,918,051—issued to Early on Apr. 5, 2011 in U.S. class 47 and subclass 45—teaches a plant growing kit, primarily for growing climbing plants, such as tomatoes, is contained in a flat box approximately the shape of a pizza box. In preferred embodiments, three legs are included, broken down into sections in the box, and directable into a sturdy tripod, over which a flexible vine-attachment element, such as a wire or thin tubular member or plastic coil, is assembled, preferably, in a tapered helical configuration. Also in the box is a basket, in flattened condition but erectable into a deep configuration and with provision for attachment to the legs, near their bottom ends. The basket is configured to contain a bag of soil that may remain in the bag. The consumer provides drainage holes in the bag and an opening at top for the plants to grow and to climb up on the tripod and vine-attachment element. With a water-catching saucer under the bag and basket, the directed plant growing assembly can be placed in any desired location, including inside a building.

It is apparent that numerous innovations for supports for tomato plants and the like have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a device for a tomato plant having tomatoes and a vine and for replaceably supporting from four orthogonal directions and from varying heights relocation of the tomatoes of the tomato plant from lower elevations to higher elevations as the tomato plant grows.

2. SUMMARY OF THE INVENTION

Thus, an object of the embodiments of the present invention is to provide a device for a tomato plant having tomatoes and a vine and for replaceably supporting from four orthogonal directions and from varying heights relocation of the tomatoes of the tomato plant from lower elevations to higher elevations as the tomato plant grows, which avoids the disadvantages of the prior art.

Briefly stated, another object of the embodiments of the present invention is to provide a device for a tomato plant having tomatoes and a vine and replaceably supporting from four orthogonal directions and from varying heights relocation of the tomatoes of the tomato plant from lower elevations to higher elevations as the tomato plant grows. The device includes uprights, cross members, and supports. The uprights are held together by the cross members. The supports are operatively and replaceably connected to the uprights, and replaceably support from the four orthogonal directions and from the varying heights the relocation of the tomatoes of the tomato plant from the lower elevations to the higher elevations as the tomato plant grows.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows.

4. LIST OF REFERENCE NUMERALS UTILIZED IN THE FIGURES OF THE DRAWING

A. Introductory.
10 device of embodiments of present invention for tomato plant 12 having tomatoes 14 and vine 16 and for replaceably supporting from four orthogonal directions 17 and from varying heights relocation of tomatoes 14 of tomato plant 12 from lower elevations to higher elevations as tomato plant 12 grows
12 tomato plant
14 tomatoes of tomato plant 12
16 vine of tomato plant 12
17 four orthogonal directions
  B. Configuration of Device 10.
18 uprights
20 cross members
22 supports for replaceably supporting from four orthogonal directions 17 and from varying heights relocation of tomatoes 14 of tomato plant 12 from lower elevations to higher elevations as tomato plant 12 grows
  C. Specific Configurations of Uprights 18.
24 slender and elongated upright of each upright of uprights 18
26 four sides of slender and elongated upright 24 of each upright of uprights 18
28 first set of through bores of slender and elongated upright of each upright of uprights 18
30 second set of through bores of slender and elongated upright 24 of each upright of uprights 18
32 pair of ends of slender and elongated upright 24 of each upright of uprights 18
34 first pair of through bores of slender and elongated upright 24 of each upright of uprights 18
36 second pair of through bores of slender and elongated upright 24 of each upright of uprights 18
  D. Specific Configuration of Cross Members 20.
38 pair of ends of each cross member of cross members 20
40 two pair of through bores of each cross member of cross members 20
42 four pair of cross members of cross members 20

44 first pair of cross members of four pair of cross members 42 of cross members 20

46 combinations of nuts and bolts of cross members 20

48 second pair of cross members of four pair of cross members 42 of cross members 20

50 third pair of cross members of four pair of cross members 42 of cross members 20

52 fourth pair of cross members of four pair of cross members 42 of cross members 20

E. Specific Configuration of Supports 22.

54 tray of each support of supports 22 for replaceably supporting from four orthogonal directions 17 relocation of tomatoes 14 of tomato plant 12 from lower elevations to higher elevations as tomato plant 12 grows 55 V-shaped portion of tray 54 of each support of supports 22 for compresingly engaging vines 16 of tomato plant 12 as tray 54 of each support of supports 22 replaceably support from four orthogonal directions 17 relocation of tomatoes 14 of tomato plant 12 from lower elevations to higher elevations as tomato plant 12 grows 56 pair of rods of each support of supports 22 for replaceably supporting from varying heights relocation of tomatoes 14 of tomato plant 12 from lower elevations to higher elevations as tomato plant 12 grows

5. DETAILED DESCRIPTION OF THE PREFERRED EMBODIMENTS

A. Introductory.

Figure 1:
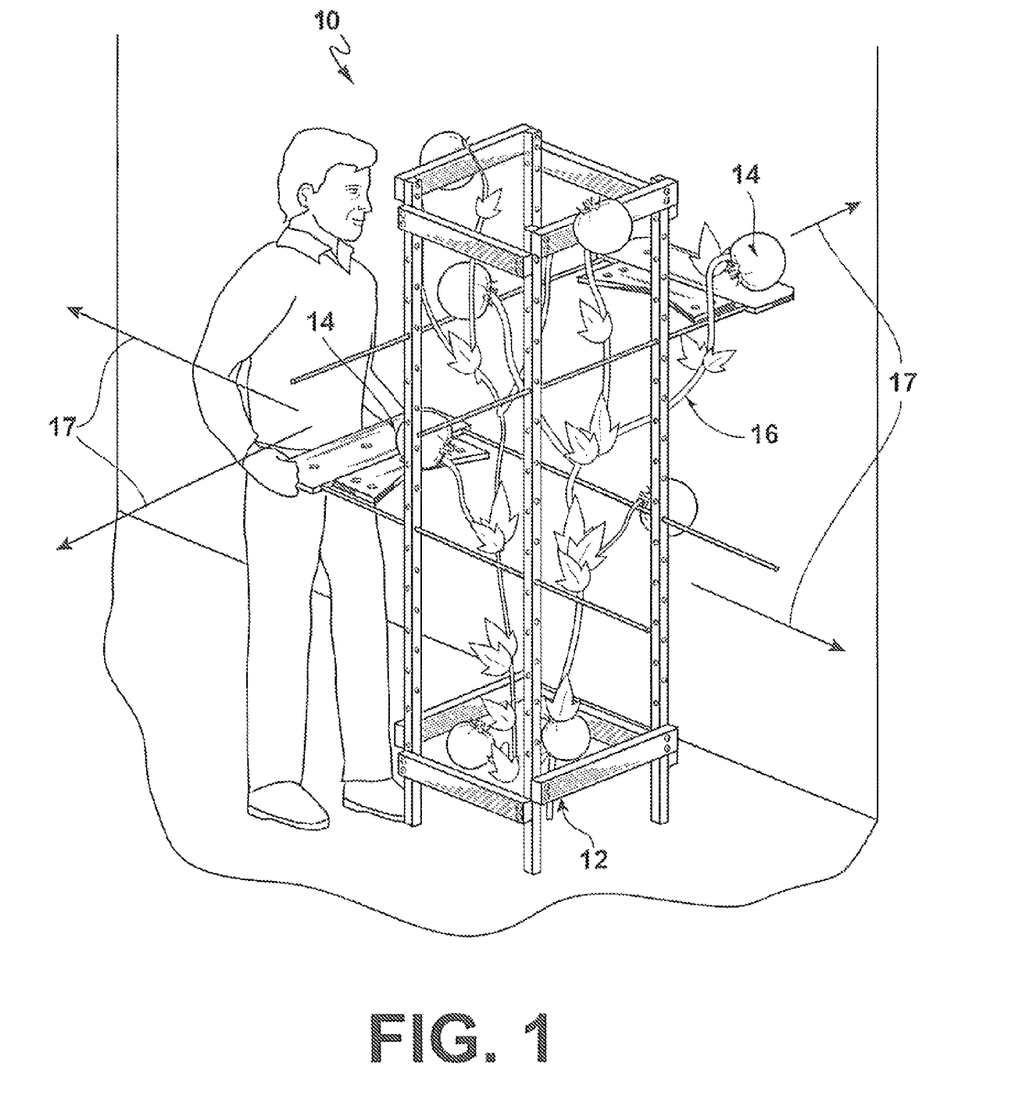
FIG. 1 is a diagrammatic perspective view of the device of the embodiments of the present invention being for a tomato plant having tomatoes and a vine and replaceably supporting from four orthogonal directions and from varying heights relocation of the tomatoes of the tomato plant from lower elevations to higher elevations as the tomato plant grows.

Referring now to the figures, in which like numerals indicate like parts, and particularly to FIG. 1, which is a diagrammatic perspective view of the device of the embodiments of the present invention being for a tomato plant having tomatoes and a vine and replaceably supporting from four orthogonal directions and from varying heights relocation of the tomatoes of the tomato plant from lower elevations to higher elevations as the tomato plant grows, the device of the embodiments of the present invention is shown generally at 10 for a tomato plant 12 having tomatoes 14 and a vine 16 and for replaceably supporting from four orthogonal directions 17 and from varying heights relocation of the tomatoes 14 of the tomato plant 12 from lower elevations to higher elevations as the tomato plant 12 grows.

B. Configuration of the Device 10.

Figure 2:
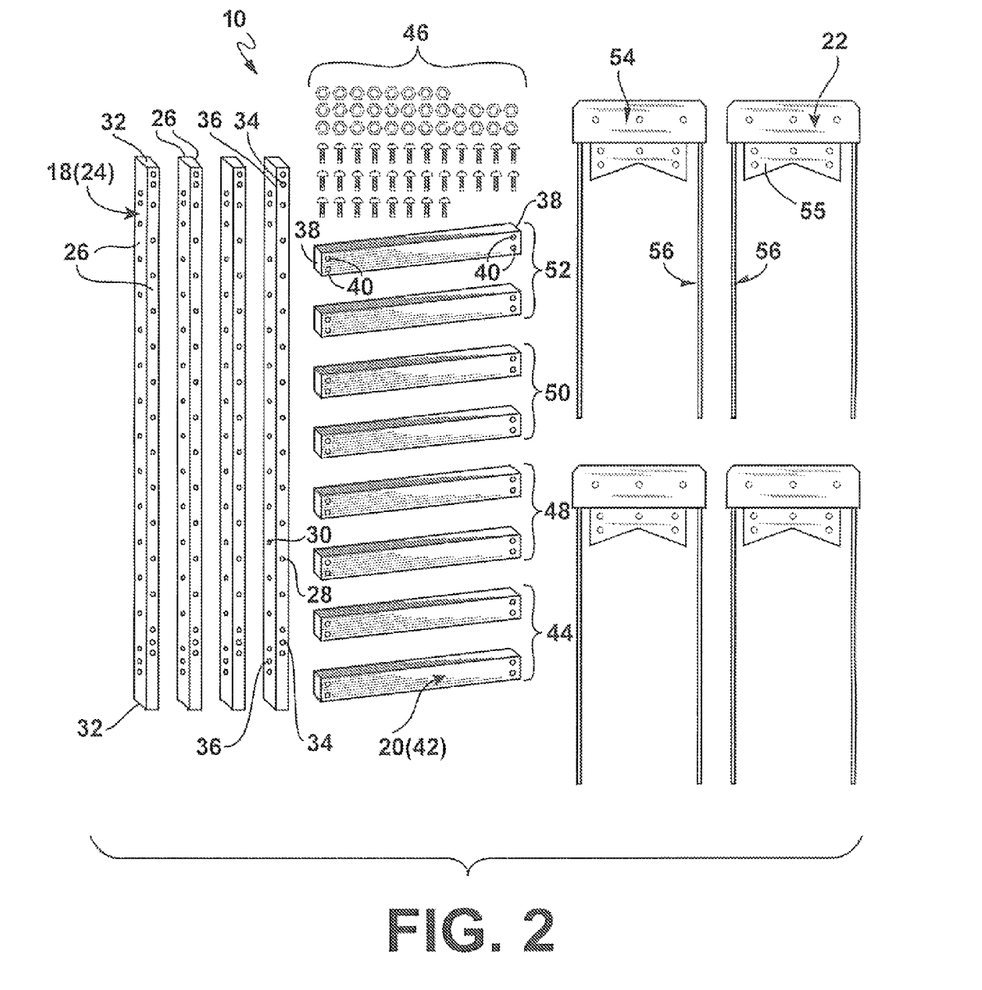
FIG. 2 is an enlarged and exploded diagrammatic perspective view of the parts of the device of the embodiments of the present invention shown in FIG. 1.
Figure 3:
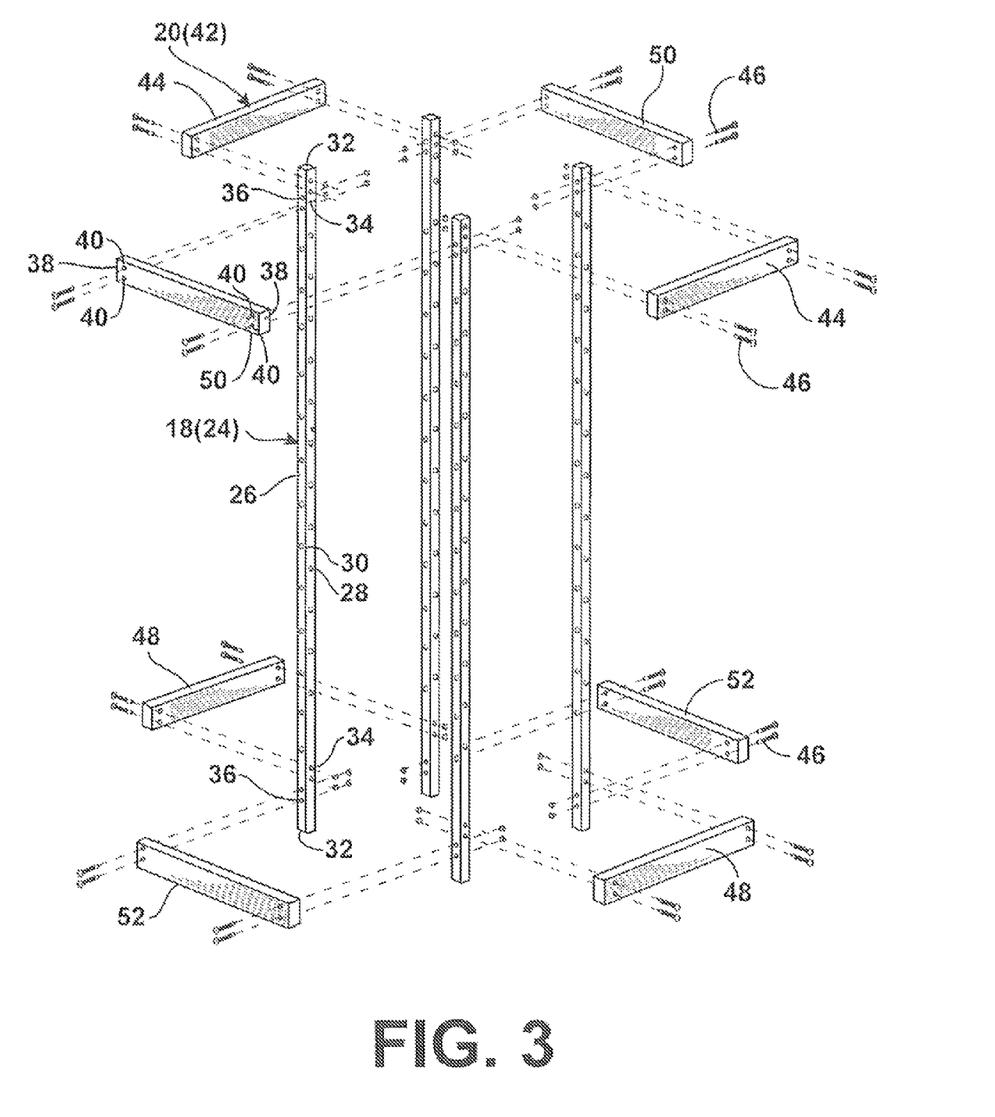
FIG. 3 is an enlarged and exploded diagrammatic perspective view of the device of the embodiments of the present invention shown in FIG. 1 beginning to be assembled.
Figure 4:
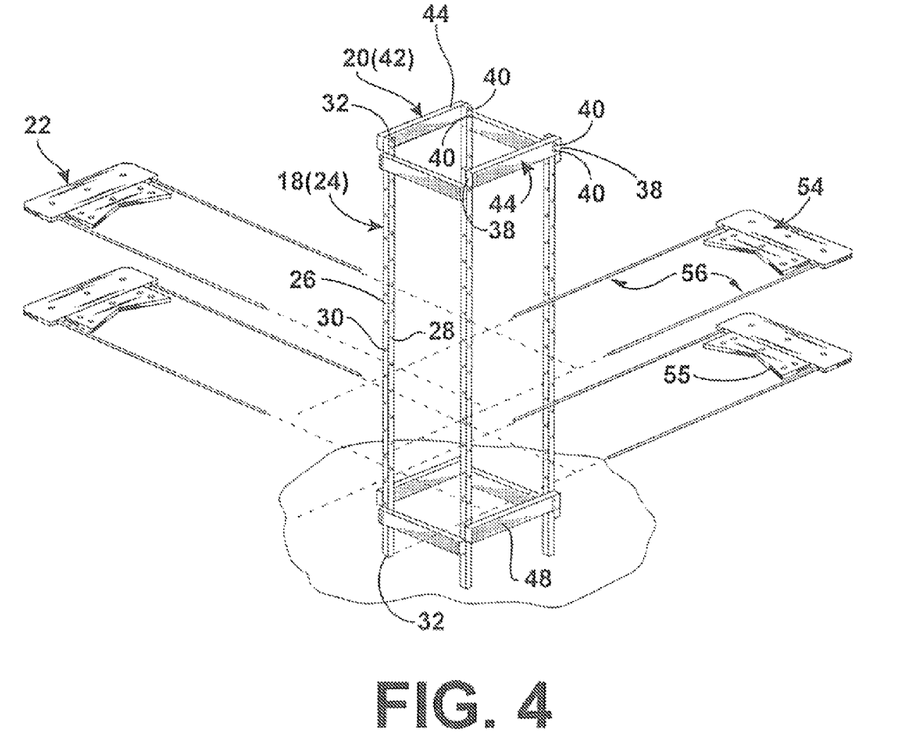
FIG. 4 is a reduced and exploded diagrammatic perspective view of the device of the embodiments of the present invention shown in FIG. 1 finally being assembled.

The configuration of the device can best be seen in FIGS. 2-4, which are, respectively, an enlarged and exploded diagrammatic perspective view of the parts of the device of the embodiments of the present invention shown in FIG. 1, an enlarged and exploded diagrammatic perspective view of the device of the embodiments of the present invention shown in FIG. 1 beginning to be assembled, and a reduced and exploded diagrammatic perspective view of the device of the embodiments of the present invention shown in FIG. 1 finally being assembled, and as such, will be discussed with reference thereto.

The device 10 comprises uprights 18, cross members 20, and supports 22. The uprights 18 are held together by the cross members 20. The supports 22 are operatively and replaceably connected to the uprights 18, and are for replaceably supporting from the four orthogonal directions 17 and from the varying heights the relocation of the tomatoes 14 of the tomato plant 12 from the lower elevations to the higher elevations as the tomato plant 12 grows.

C. Specific Configurations of the Uprights 18.

Each upright 18 is a slender and elongated upright 24.

The slender and elongated upright 24 of each upright 18 is quadrilateral in lateral cross section, and as such, has four sides 26.

The slender and elongated upright 24 of each upright 18 has a first set of through bores 28.

The first set of through bores 28 of the slender and elongated upright 24 of each upright 18 extend axially therealong, and are equally spaced-apart from each other.

The first set of through bores 28 of the slender and elongated upright 24 of each upright 18 extend through a first pair of opposing sides 26 of the slender and elongated upright 24 of an associated upright 18.

The slender and elongated upright 24 of each upright 18 further has a second set of through bores 30.

The second set of through bores 30 of the slender and elongated upright 24 of each upright 18 extend axially therealong, and are equally spaced-apart from each other.

The second set of through bores 30 of the slender and elongated upright 24 of each upright 18 extend through a remaining pair of opposing sides 26 of the slender and elongated upright 24 of an associated upright 18.

The second set of through bores 30 of the slender and elongated upright 24 of each upright 18 are offset from the first set of through bores 28 of the slender and elongated upright 24 of an associated upright 18 so as not to interfere with each other.

The slender and elongated upright 24 of each upright 18 further has a pair of ends 32.

The slender and elongated upright 24 of each upright 18 further has a first pair of through bores 34.

The first pair of through bores 34 of the slender and elongated upright 24 of each upright 18 extend at each end 32 of the slender and elongated upright 24 of an associated upright 18.

The first pair of through bores 34 of the slender and elongated upright 24 of each upright 18 extend through the first pair of opposing sides 26 of the slender and elongated upright 24 of an associated upright 18.

The slender and elongated upright 24 of each upright 18 further has a second pair of through bores 36.

The second pair of through bores 36 of the slender and elongated upright 24 of each upright 18 extend at each end 32 of the slender and elongated upright 24 of an associated upright 18.

The second pair of through bores 36 of the slender and elongated upright 24 of each upright 18 extend through the remaining pair of opposing sides 26 of the slender and elongated upright 24 of an associated upright 18.

The second pair of through bores 36 of the slender and elongated upright 24 of each upright 18 are offset from the first pair of through bores 34 of the slender and elongated upright 24 of an associated upright 18 so as not to interfere with each other.

The uprights 18 are vertically oriented, and parallel to each other.

The uprights 18 are disposed at corners of a quadrilateral.

D. Specific Configuration of the Cross Members 20.

Each cross member 20 has a pair of ends 38.

Each cross member 20 further has two pair of through bores 40.

Each pair of through bores 40 of each cross member 20 is disposed at a respective end 38 of an associated cross member 20.

Each pair of through bores 40 of each cross member 20 are vertically spaced-apart.

The cross members 20 comprise four pair of cross members 42.

A first pair of cross members 44 of the four pair of cross members 42 of the cross members 20 oppose each other, and are disposed at one end 32 of the slender and elongated uprights 24 of the uprights 18.

Each pair of through bores 40 of each cross member 20 of the first pair of cross members 44 of the four pair of cross members 42 of the cross members 20 align with the first pair of through bores 34 of associated slender and elongated uprights 24 of the uprights 18.

The cross members 20 further comprise combinations of nuts and bolts 46.

The bolts of the combinations of nuts and bolts 46 of the cross members 20 pass through the two pair of through bores 40 of each cross member 20 of the first pair of cross members 44 of the four pair of cross members 42 of the cross members 20 and through the first pair of through bores 34 of associated slender and elongated uprights 24 of the uprights 18 and receive nuts of the combinations of nuts and bolts 46 of the cross members 20, respectively, to thereby attach the first pair of cross members 44 of the four pair of cross members 42 of the cross members 20 to the associated slender and elongated uprights 24 of the uprights 18.

A second pair of cross members 48 of the four pair of cross members 42 of the cross members 20 oppose each other, and are disposed at the other end 32 of the slender and elongated uprights 24 of the uprights 18.

Each pair of through bores 40 of each cross member 20 of the second pair of cross members 44 of the four pair of cross members 42 of the cross members 20 align with the first pair of through bores 34 of associated slender and elongated uprights 24 of the uprights 18.

The bolts of the combinations of nuts and bolts 46 of the cross members 20 pass through the two pair of through bores 40 of each cross member 20 of the second pair of cross members 48 of the four pair of cross members 42 of the cross members 20 and through the first pair of through bores 34 of associated slender and elongated uprights 24 of the uprights 18 and receive nuts of the combinations of nuts and bolts 46 of the cross members 20, respectively, to thereby attach the second pair of cross members 48 of the four pair of cross members 42 of the cross members 20 to the associated slender and elongated uprights 24 of the uprights 18.

The second pair of cross members 48 of the four pair of cross members 42 of the cross members 20 are parallel to the first pair of cross members 44 of the four pair of cross members 42 of the cross members 20.

A third pair of cross members 50 of the four pair of cross members 42 of the cross members 20 oppose each other, and are disposed at the one end 32 of the slender and elongated uprights 24 of the uprights 18.

Each pair of through bores 40 of each cross member 20 of the third pair of cross members 50 of the four pair of cross members 42 of the cross members 20 align with the second pair of through bores 36 of associated slender and elongated uprights 24 of the uprights 18.

The bolts of the combinations of nuts and bolts 46 of the cross members 20 pass through the two pair of through bores 40 of each cross member 20 of the third pair of cross members 50 of the four pair of cross members 42 of the cross members 20 and through the second pair of through bores 36 of associated slender and elongated uprights 24 of the uprights 18 and receive nuts of the combinations of nuts and bolts 46 of the cross members 20, respectively, to thereby attach the third pair of cross members 50 of the four pair of cross members 42 of the cross members 20 to the associated slender and elongated uprights 24 of the uprights 18.

The third pair of cross members 50 of the four pair of cross members 42 of the cross members 20 are perpendicular to, and are in close proximity to, the first pair of cross members 44 of the four pair of cross members 42 of the cross members 20.

A fourth pair of cross members 52 of the four pair of cross members 42 of the cross members 20 oppose each other, and are disposed at the other end 32 of the slender and elongated uprights 24 of the uprights 18.

Each pair of through bores 40 of each cross member 20 of the fourth pair of cross members 52 of the four pair of cross members 42 of the cross members 20 align with the second pair of through bores 36 of associated slender and elongated uprights 24 of the uprights 18.

The bolts of the combinations of nuts and bolts 46 of the cross members 20 pass through the two pair of through bores 40 of each cross member 20 of the fourth pair of cross members 52 of the four pair of cross members 42 of the cross members 20 and through the second pair of through bores 36 of associated slender and elongated uprights 24 of the uprights 18 and receive nuts of the combinations of nuts and bolts 46 of the cross members 20, respectively, to thereby attach the fourth pair of cross members 52 of the four pair of cross members 42 of the cross members 20 to the associated slender and elongated uprights 24 of the uprights 18.

The fourth pair of cross members 52 of the four pair of cross members 42 of the cross members 20 are parallel to the third pair of cross members 50 of the four pair of cross members 42 of the cross members 20.

The fourth pair of cross members 52 of the four pair of cross members 42 of the cross members 20 are perpendicular to, and are in close proximity to, the second pair of cross members 48 of the four pair of cross members 42 of the cross members 20.

E. Specific Configuration of the Supports 22.

Each support 22 comprises a tray 54. The tray 54 of each support 22 is for replaceably supporting from the four orthogonal directions 17 relocation of the tomatoes 14 of the tomato plant 12 from the lower elevations to the higher elevations as the tomato plant 12 grows.

The tray 54 of each support 22 is horizontally oriented and flat.

The tray 54 of each support 22 has a V-shaped portion 55. The V-shaped portion 55 of the tray 54 of each support 22 is for compresingly engaging the vine 16 of the tomato plant 12 as the tray 54 of each support 22 replaceably supports from the four orthogonal directions 17 relocation of the tomatoes 14 of the tomato plant 12 from the lower elevations to the higher elevations as the tomato plant 12 grows.

Each support 22 further comprises a pair of rods 56.

The pair of rods 56 of each support 22 are horizontally oriented and parallel to each other.

The pair of rods 56 of each support 22 extend from the tray 54 of an associated support 22.

The pair of rods 56 of each support 22 extend replaceably through an associated pair of at least one of the second set of through bores 30 of the slender and elongated upright 24 of each upright 18 and the first set of through bores 28 of the slender and elongated upright 24 of an associated upright 18 and are for replaceably supporting from varying heights relocation of the tomatoes 14 of the tomato plant 12 from the lower elevations to the higher elevations as the tomato plant 12 grows.

F. Impressions.

It will be understood that each of the elements described above or two or more together may also find a useful application in other types of constructions differing from the types described above.

While the embodiments of the present invention have been illustrated and described as embodied in a device for a tomato plant having tomatoes and a vine and for replaceably supporting from four orthogonal directions and from varying heights relocation of the tomatoes of the tomato plant from lower elevations to higher elevations as the tomato plant grows, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A device for a tomato plant having tomatoes and a vine and for replaceably supporting from four orthogonal directions and from varying heights relocation of the tomatoes of the tomato plant from lower elevations to higher elevations as the tomato plant grows, said device comprising:
   a) uprights;
   b) cross members; and
   c) supports;
   wherein said uprights are held together by said cross members;
   wherein said supports are operatively connected to said uprights;
   wherein said supports are replaceably connected to said uprights; and
   wherein said supports are for replaceably supporting from the four orthogonal directions and from the varying heights the relocation of the tomatoes of the tomato plant from the lower elevations to the higher elevations as the tomato plant grows wherein each upright is a slender and elongated upright; wherein said slender and elongated upright of each upright is quadrilateral in lateral cross section, and as such, has four sides; wherein said slender and elongated upright of each upright has a first set of through bores; wherein said first set of through bores of said slender and elongated upright of each upright are equally spaced-apart from each other; wherein said first set of through bores of said slender and elongated upright of each upright extend through a first pair of opposing sides of said slender and elongated upright of an associated upright; wherein said slender and elongated upright of each upright has a second set of through bores; wherein said second set of through bores of said slender and elongated upright of each upright extend through a remaining pair of opposing sides of said slender and elongated upright of an associated upright; wherein said slender and elongated upright of each uptight has a pair of ends; wherein said slender and elongated upright of each upright has a first pair of through bores; wherein said slender and elongated upright of each uptight has a second pair of through bores; wherein each support comprises a tray; and wherein said tray of each support is for replaceably supporting from the four orthogonal directions the relocation of the tomatoes of the tomato plant from the lower elevations to the higher elevations as the tomato plant grows; wherein said tray of each support is horizontally oriented; wherein said tray of each support is flat; wherein said tray of each support has a V-shaped portion; and wherein said V-shaped portion of said tray of each support is for compresingly engaging the vine of the tomato plant as said tray of each support replaceably supports from the four orthogonal directions the relocation of the tomatoes of the tomato plant from the lower elevations to the higher elevations as the tomato plant grows; wherein each support comprises a pair of rods; wherein said pair of rods of each support are horizontally oriented; wherein said pair of rods of each support are parallel to each other; wherein said pair of rods of each support extend from said tray of an associated support; wherein said pair of rods of each support extend replaceably through an associated pair of one of said second set of through bores of said slender and elongated upright of each upright and said first set of through bores of said slender and elongated upright of an associated upright; wherein said pair of rods of each support are for replaceably supporting from varying heights the relocation of the tomatoes of the tomato plant from the lower elevations to the higher elevations as the tomato plant grows.

2. The device of claim 1, wherein said first set of through bores of said slender and elongated upright of each upright extend axially therealong.

3. The device of claim 1, wherein said second set of through bores of said slender and elongated upright of each upright extend axially therealong.

4. The device of claim 1, wherein said second set of through bores of said slender and elongated upright of each upright are equally spaced-apart from each other.

5. The device of claim 1, wherein said second set of through bores of said slender and elongated upright of each upright are offset from said first set of through bores of said slender and elongated upright of an associated upright so as not to interfere with each other.

6. The device of claim 1, wherein said first pair of through bores of said slender and elongated upright of each upright extend at each end of said slender and elongated upright of an associated upright.

7. The device of claim 1, wherein said first pair of through bores of said slender and elongated upright of each upright extend through said first pair of opposing sides of said slender and elongated upright of an associated upright.

8. The device of claim 1, wherein said second pair of through bores of said slender and elongated upright of each upright extend at each end of said slender and elongated upright of an associated upright.

9. The device of claim 1, wherein said second pair of through bores of said slender and elongated upright of each upright extend through said remaining pair of opposing sides of said slender and elongated upright of an associated upright.

10. The device of claim 1, wherein said second pair of through bores of said slender and elongated upright of each upright are offset from said first pair of through bores of said slender and elongated upright of an associated upright so as not to interfere with each other.

11. The device of claim 1, wherein said uprights are vertically oriented.

12. The device of claim 1, wherein said uprights are parallel to each other.

13. The device of claim 1, wherein said uprights are disposed at corners of a quadrilateral.

14. The device of claim 1, wherein each cross member has a pair of ends.

15. The device of claim 14, wherein each cross member has two pair of through bores.

16. The device of claim 15, wherein each pair of through bores of each cross member is disposed at each end of an associated cross member.

17. The device of claim 15, wherein each two pair of through bores of each cross member are vertically spaced-apart.

18. The device of claim 15, wherein said cross members comprise four pair of cross members.

19. The device of claim 18, wherein a first pair of cross members of said four pair of cross members of said cross members oppose each other.

20. The device of claim 19, wherein said first pair of cross members of said four pair of cross members of said cross members are disposed at one ends of said slender and elongated uprights of said uprights.

21. The device of claim 20, wherein said cross members comprise combinations of nuts and bolts.

22. The device of claim 21, wherein said bolts of said combinations of nuts and bolts of said cross members pass through said pair of through bores of each cross member of said first pair of cross members of said four pair of cross members of said cross members and through said first pair of through bores of associated slender and elongated uprights of said uprights and receive said nuts of said combinations of nuts and bolts of said cross members, respectively, to thereby attach said first pair of cross members of said four pair of cross members of said cross members to associated slender and elongated uprights of said uprights.

23. The device of claim 21, wherein a second pair of cross members of said four pair of cross members of said cross members oppose each other.

24. The device of claim 23, wherein said second pair of cross members of said four pair of cross members of said cross members are disposed at the other ends of said slender and elongated uprights of said uprights.

25. The device of claim 24, wherein a third pair of cross members of said four pair of cross members of said cross members oppose each other.

26. The device of claim 25, wherein said third pair of cross members of said four pair of cross members of said cross members are disposed at said one ends of said slender and elongated uprights of said uprights.

27. The device of claim 25, wherein said two pair of through bores of each cross member of said third pair of cross members of said four pair of cross members of said cross members align with said second pair of through bores of associated slender and elongated uprights of said uprights.

28. The device of claim 25, wherein said bolts of said combinations of nuts and bolts of said cross members pass through said two pair of through bores of each cross member of said third pair of cross members of said four pair of cross members of said cross members and through said second pair of through bores of associated slender and elongated uprights of said uprights and receive nuts of said combinations of nuts and bolts of said cross members, respectively, to thereby attach said third pair of cross members of said four pair of cross members of said cross members to said associated slender and elongated uprights of said uprights.

29. The device of claim 25, wherein said third pair of cross members of said four pair of cross members of said cross members are perpendicular to said first pair of cross members of said four pair of cross members of said cross members.

30. The device of claim 25, wherein said third pair of cross members of said four pair of cross members of said cross members are in close proximity to said first pair of cross members of said four pair of cross members of said cross members.

31. The device of claim 25, wherein a fourth pair of cross members of said four pair of cross members of said cross members oppose each other.

32. The device of claim 31, wherein said fourth pair of cross members of said four pair of cross members of said cross members are disposed at said other ends of said slender and elongated uprights of said uprights.

33. The device of claim 31, wherein each pair of through bores of each cross member of said fourth pair of cross members of said four pair of cross members of said cross members align with said second pair of through bores of associated slender and elongated uprights of said uprights.

34. The device of claim 31, wherein said fourth pair of cross members of said four pair of cross members of said cross members are parallel to said third pair of cross members of said four pair of cross members of said cross members.

35. The device of claim 31, wherein said fourth pair of cross members of said four pair of cross members of said cross members are perpendicular to said second pair of cross members of said four pair of cross members of said cross members.

36. The device of claim 31, wherein said fourth pair of cross members of said four pair of cross members of said cross members are in close proximity to said second pair of cross members of said four pair of cross members of said cross members.

37. The device of claim 25, wherein said bolts of said combinations of nuts and bolts of said cross members pass through said two pair of through bores of each cross member of said fourth pair of cross members of said four pair of cross members of said cross members and through said second pair of through bores of associated slender and elongated uprights of said uprights and receive nuts of said combinations of nuts and bolts of said cross members, respectively, to thereby attach said fourth pair of cross members of said four pair of cross members of said cross members to said associated slender and elongated uprights of said uprights.

38. The device of claim 23, wherein each two pair of through bores of each cross member of said second pair of cross members of said four pair of cross members of said cross members align with said first pair of through bores of associated slender and elongated uprights of said uprights.

39. The device of claim 23, wherein said bolts of said combinations of nuts and bolts of said cross members pass through said two pair of through bores of each cross member of said second pair of cross members of said four pair of cross members of said cross members and through said first pair of through bores of associated slender and elongated uprights of said uprights and receive nuts of said combinations of nuts and bolts of said cross members, respectively, to thereby attach said second pair of cross members of said four pair of cross members of said cross members to said associated slender and elongated uprights of said uprights.

40. The device of claim 23, wherein said second pair of cross members of said four pair of cross members of said cross members are parallel to said first pair of cross members of said four pair of cross members of said cross members.

41. The device of claim 19, wherein each pair of through bores of each cross member of said first pair of cross members of said four pair of cross members of said cross members align with said first pair of through bores of associated slender and elongated uprights of said uprights.

* * * * *